(12) United States Patent
Roytman et al.

(10) Patent No.: US 7,437,445 B1
(45) Date of Patent: Oct. 14, 2008

(54) SYSTEM AND METHODS FOR HOST NAMING IN A MANAGED INFORMATION ENVIRONMENT

(75) Inventors: Evgeny Roytman, Sharon, MA (US); Benjamin Thrift, Reston, VA (US); Steven M. Stramaglia, Maynard, MA (US); Gregory MacKinnon, Somerville, MA (US); Samuil Shmuylovich, Framingham, MA (US); Yogesh Athawale, Bellingham, MA (US); Boris Farizon, Westborough, MA (US); Stephen Alton Walsh, Milford, MA (US); Terrence Lewis, Accokeek, MD (US)

(73) Assignee: EMC Corporation, Hopkinton, MA (US)

( * ) Notice: Subject to any disclaimer, the term of this patent is extended or adjusted under 35 U.S.C. 154(b) by 979 days.

(21) Appl. No.: 10/812,860

(22) Filed: Mar. 30, 2004

(51) Int. Cl.
*G06F 15/173* (2006.01)

(52) U.S. Cl. .................................... 709/223

(58) Field of Classification Search ................ 709/223, 709/220, 227, 230
See application file for complete search history.

(56) References Cited

U.S. PATENT DOCUMENTS 5,617,540 A * 4/1997 Civanlar et al. ........ 370/395.54
5,878,212 A * 3/1999 Civanlar et al. ............. 709/203
6,286,047 B1 * 9/2001 Ramanathan et al. ........ 709/224
6,931,449 B2 * 8/2005 Schmidt et al. ............. 709/228
7,212,878 B2 * 5/2007 Funk et al. .................. 700/121
7,254,708 B2 * 8/2007 Silvester ..................... 713/170
7,260,737 B1 * 8/2007 Lent et al. ....................... 714/5

* cited by examiner

*Primary Examiner*—David Y Eng
(74) *Attorney, Agent, or Firm*—Chapin IP Law, LLC

(57) ABSTRACT

A custom host naming mechanism that allows a user to define a custom host name as a virtual name for the hosts in the managed information environment, such as the storage area network, overcomes the shortcomings of the use of a network assigned machine name during a failover operation. The custom host naming mechanism allows the operator to define a mnemonic virtual name for each host in the managed information environment, thereby facilitating failover switching. Further, such secondary hosts may undertake offline, lower priority executing tasks while not in failover mode, and rapidly reconfigure as the failover secondary host should the need arise. Therefore, secondary hosts at a hot site deploy with a mnemonically descriptive name indicative of their status as a secondary host for a corresponding primary host, and further, need not remain idle pending a disaster recovery scenario, but rather are employable for offloading of other, lower priority tasks pending failover response.

33 Claims, 11 Drawing Sheets

SYSTEM AND METHODS FOR HOST NAMING IN A MANAGED INFORMATION ENVIRONMENT

BACKGROUND OF THE INVENTION

In a conventional managed information system, such as a storage area network (SAN) operable to coordinate access to mass storage devices by a set of users, the network (SAN) interconnects a plurality of storage device nodes and associated interconnection nodes. The storage area network includes a variety of nodes for providing mass storage retrieval services to users, such as storage devices (e.g. disc drive arrays), connectivity devices (e.g. switches and routers), and conventional host computers for executing user applications and software components called agents for monitoring and controlling the nodes in the storage area network. The resultant infrastructure, therefore, for monitoring and controlling the storage area network, defines a complex array of nodes and interconnections.

Each of the nodes in the conventional SAN is a manageable entity controllable by a management application. The conventional storage area network generally has many manageable entities of various types. Conventional storage area networks typically allocate a particular agent to one or more manageable entities based on matching, or corresponding types. Therefore, the system may deploy many agents to correspond to the number and types of manageable entities in the storage area network. In a particular configuration, the conventional nodes include manageable entities responsive to the SAN management application and include storage entities, connectivity entities, and database entities. The result is a complex set of interrelations between the agents and the corresponding manageable entities.

Conventional agents typically execute on a host computer system (host) adapted to support one or more agents. Further, the hosts themselves are manageable entities responsive to the management application. Since there may be multiple hosts in a managed information environment, the management application may display and/or reference multiple hosts simultaneously. Accordingly, the hosts each employ a host name for mnemonically facilitating the identity and operative responsibility of the host. The management application is responsible for establishing and maintaining responsiveness of the various manageable entities to the host computer systems (hosts) which manage the manageable entities.

SUMMARY

Conventional networks apply node names to each interconnected entity in the network to distinguish each of the nodes from each other and to facilitate identification of the nodes for tracking status, diagnostics, performance, and other criteria. Often the node name bears a resemblance to the function, location, or purpose of the node such that a human operator associates a mnemonic congruence with the machine. In a large network with many individually named nodes, meaningful mnemonic names allow a conventional operator to readily identify and understand the role of a particular node (machine) without requiring manual research or indexing to determine the identity, function, or purpose of that conventional machine.

In a typical conventional managed information environment, such as a storage area network, a plurality of host computer systems interoperate with other manageable entities. Each of the manageable entities interconnect via a network infrastructure, such as a LAN, WAN, intranet, extranet, and/or the Internet. Further, each of the manageable entities is responsive to the host computer system managing that manageable entity. Typical conventional networks identify the interconnected manageable entities, or nodes, via a physical or logical network identifier such as an IP address. Further, since such network identifiers are typically numeric and/or not intuitively descriptive, a mnemonic machine name also applies to each conventional network node. The machine name is employed for referencing the machine in the network, much as a mnemonic URL is often employed to identify the IP address of an Internet web server.

Therefore, the management application operable to oversee and monitor such a storage area network may apply a virtual name to each of the hosts in the managed information environment. Such a virtual name allows the application to apply a mnemonic reference to each of the hosts which is not bound to the machine name. The virtual name may therefore be derived from a variety of sources, such as specified by a user or operator, codified in an initialization file, or defaulted from the machine name, to illustrate several exemplary naming mechanisms.

However, in such a storage area network, it is often desirable to establish a failover mechanism to an alternate "hot site" to guard against catastrophic or disaster related failure at a primary site. Such a failover mechanism typically involves shadowing stored data at the hot site to mirror the primary site. Further, such a failover mechanism also provides that each of the hosts (primary hosts) at the primary site is mirrored by a secondary host at the hot site. A failover link maintains the hot site in a synchronous manner with the primary site. In the event of such catastrophic failure, the management application enables the hot site for providing the storage area network services to the users via the shadowed stored data and the secondary hosts mirroring the primary hosts.

In conventional management applications, therefore, the hot site mirrors the primary site. Accordingly, the conventional management application applies the machine name as the virtual name for each secondary host. Since the hot site mirrors the primary site, the management application establishes a similar configuration on the hot site by establishing the hosts with their machine name as the virtual name. However, since the machine name is different for each host, the relation from the newly activated secondary host to the corresponding primary host may not be readily apparent. Therefore, in the event of such disaster relief, the virtual name is not indicative of the activation of the secondary host in lieu of the primary host. An operator of the management application may find it cumbersome to manage deployment of the hot site over the primary site, since the virtual name of each host node (machine) is effectively predetermined by the machine name, which may not bear a mnemonic relevance to the operation as the secondary host. Further, since the hardcoded machine name is somewhat fixed, the management application is impeded from utilizing the secondary host for alternate purposes by changing the machine name to correspond to an alternate purpose.

Accordingly, it would be beneficial to provide a dynamic host application naming mechanism to allow an operator of the management application to define the virtual name of the secondary hosts operable at the hot site. Therefore, configurations of the invention are based, in part, on the observation that secondary hosts typically employ a predetermined host name derived from the machine name. Such a predetermined host name does not provide for a virtual name indicative of the hot site. Further, the secondary host tends to remain idle under the predetermined host name, unable to undertake execution of other tasks because of the need to remain as a standby secondary host.

The present invention substantially overcomes particular shortcomings of the above described conventional methods of application naming of secondary hosts at a hot site by defining a custom host naming mechanism which allows a user to define a custom host name as the virtual name for the hosts in the managed information environment, such as the storage area network. The custom host naming mechanism allows the operator to define and/or modify a mnemonic virtual name for each host in the managed information environment. Therefore, secondary hosts may receive a name indicative of the hot site status such as "HOST_A2_EXECUTING_AS_FAILOVER_HOST_A1", for example. Further, such secondary hosts may undertake offline, lower priority executing tasks while not in failover mode, and rapidly reconfigure as the failover secondary host should the need arise. Therefore, secondary hosts at a hot site are deployable with a mnemonically descriptive name indicative of their status as a secondary host for a corresponding primary host, and further, need not remain idle pending a disaster recovery scenario, but rather are employable for offloading of other, lower priority tasks until needed as a secondary failover host.

In further detail, the method of referencing a host computing system in a storage area network includes identifying a machine name assigned to the host computing system in the managed information environment, in which the machine name corresponds to a network identity of the host computing system. The server executing the management application receives, from an agent, a virtual name indicative of the host computing system, in which the virtual name corresponds to an application identity (i.e. identity as seen by the management application) of the host computing system. The server executes the management application operable to reference the host computing system, in which the management application is operable to employ the machine name for network references to the host computing system and further operable to employ the virtual name for application references to the host computing system. Therefore, the machine name and the virtual name simultaneously refer to the host computing system, in which the virtual name is dynamically modifiable by the management application, as will be discussed further below.

In the exemplary configuration, the virtual name is operable to distinguish the host computing system from the virtual names corresponding to other computing systems in the storage area network. An operator or other user defines the virtual name in a virtual name repository at the host, such as a disk file, in which the management application is operable to receive the virtual name of the host from the virtual name repository.

In the exemplary failover (i.e. hot site) configuration discussed below, the host computing system is a first host and the SAN further comprises a second host, in which the second host is operable as a failover computing system complementing the first host. In such a failover relation, supported by a failover link, the second host is operable for interchangeable performance with manageable entities in the storage area network. Accordingly, the first host and second host are a failover pair operable for substitute engagement in the storage area network, in which the virtual name of the first and second host operable for dynamic naming independently of the machine name of the first and second host.

During normal operation, the first host is in active communication with one or more manageable entities for managing the manageable entity, in which the manageable entities are responsive to the first host via the active communication. Upon a failover operation, the management application deactivates the active communication between the first host and the manageable entities, designating the second host as managing the manageable entities formerly under the first (primary) host, and restarting the manageable entities to establish active communication between the second host and the manageable entities, at which time the active communication provides responsiveness of the manageable entities to the second host.

To enable the failover operation, the SAN couples the first host and the second host via a failover link, in which the failover link operable to synchronize the first host and the second host. The management application then performs similar data manipulation operations via the first host and the second host, the similar data manipulations operable to enable operation as a failover pair.

In a typical failover scenario, the management application identifies an operational condition at the first host indicative of an inability of the first host to manage the manageable entities, such as a power failure, natural disaster, or catastrophic interruption. An operator or automated entity directs the management application to stop the first host. The operator or automated entity, via the management application, modifies the virtual name of the second host indicative of failover operation from the first host, and directs the management application to employ the second host as emulating the first host. The second host then begins execution, takes notice of the virtual name, and executes under the newly assigned virtual name. Therefore, in such a failover pair arrangement, the first and second hosts are operable to perform interchangeably with other managed entities in the managed information network.

The invention as disclosed above is described as implemented on a computer having a processor, memory, and interface operable for performing the steps and methods for monitoring an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

A custom host naming mechanism which allows a user to define a custom host name as the virtual name for the hosts in the managed information environment, such as the storage area network, overcomes the shortcomings presented above with respect to use of the network assigned machine name during a failover operation. The custom host naming mechanism allows the operator to define and/or modify a mnemonic virtual name for each host in the managed information environment, thereby facilitating failover switching. Further, such secondary hosts may undertake offline, lower priority executing tasks while not in failover mode, and rapidly reconfigure as the failover secondary host should the need arise. Therefore, secondary hosts at a hot site are deployable with a mnemonically descriptive name indicative of their status as a secondary host for a corresponding primary host, and further, need not remain idle pending a disaster recovery scenario, but rather are employable for offloading of other, lower priority tasks until needed as a secondary failover host.

Figure 1:
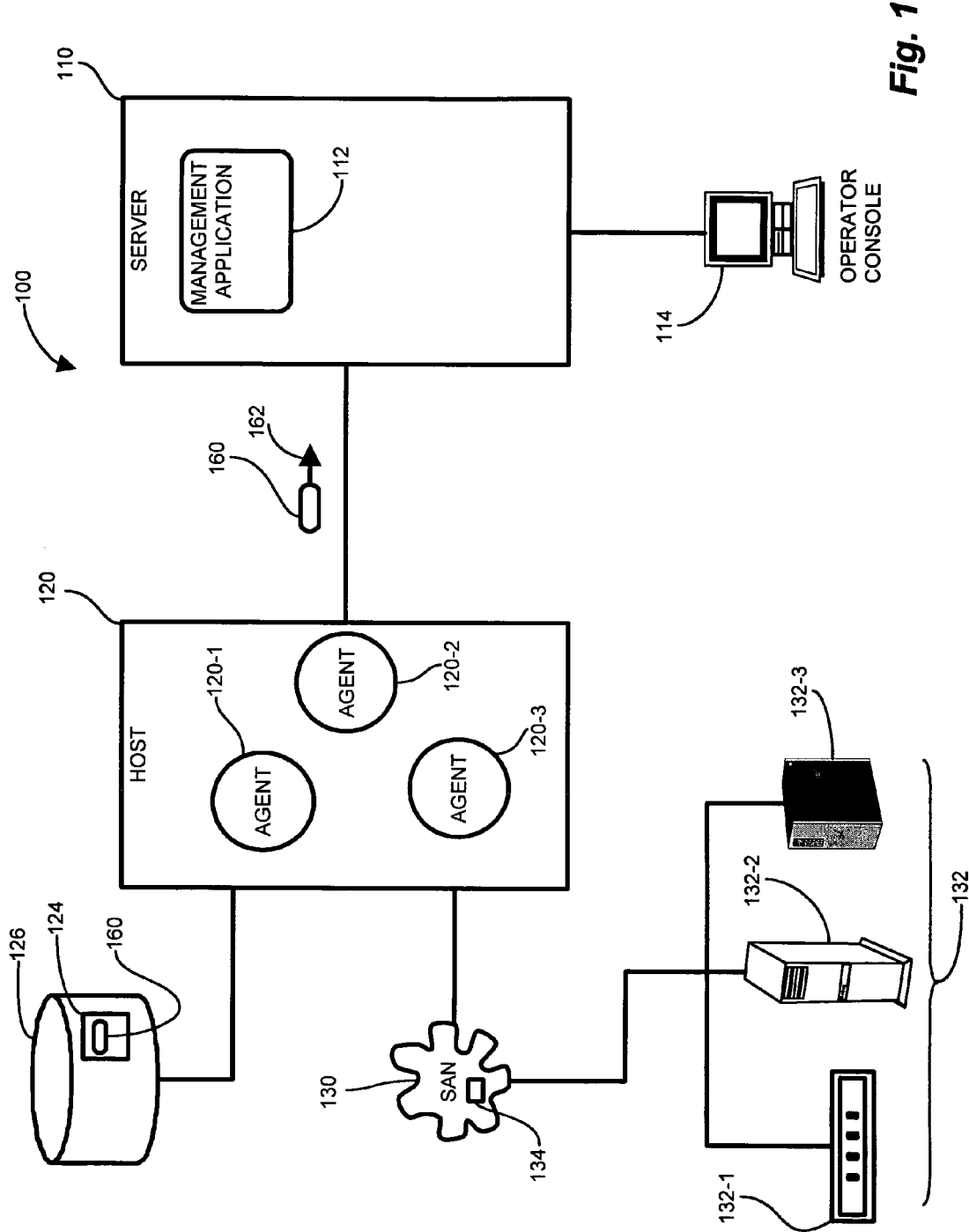
FIG. 1 is a context diagram for managing agents in a managed information network such as a storage area network.

FIG. 1 is a context diagram for managing agents in a managed information network such as a storage area network. Referring to FIG. 1, the managed information network 100 includes a server 110, and one or more hosts 120, interconnected to the storage area network (SAN) 130. The sever 110 executes a management application 112 for allowing operator interaction with the SAN 130 via a console 114. The storage area network 130 includes a plurality of manageable entities 132, including connectivity devices 132-1 such as switches and routers, hosts 132-2, and storage arrays 132-3. The host 120 executes one or more agents 120-1 ... 120-N operable for monitoring and controlling the manageable entities 132. By default, the host 120 receives a network name 134, based on the network 130 configuration, which is typically indicative of the IP address, MAC address, or other type of hardcoded or network location based identity (reference).

An external configuration device 126, typically a network disk or other repository accessible to multiple host computer systems, stores startup and other information concerning the agents 120-N and the manageable entities 132 which they monitor, including a host name file 124. Alternative configurations may simply employ a local disk as a configuration device in lieu of the external configuration device 126. The host name file 124 includes a virtual name 160 of the host 120. One of the agents 120-N, such as a master agent 120-1, reads the host name file 124 to retrieve and send the virtual name 160 to the server 110 in an initialization message 162 or other message. The server 110 executes the management application 112 to interact with and control the manageable entities 132 in the SAN 130 via the agents 120-N. Upon the management application 112 receiving the virtual name 160 via the host name message 162, the management application 112 references the host 120 by the virtual name 160 for interaction and reporting concerning the host 120 by the console 114. Other network level references to the host 120 may continue to reference the host via the machine name 134, thus the same host 120 may be known by both the virtual name 160 to the management application 112 and by the machine name 134 for network, operating system, and other references or instructions to the host 120.

Figure 2:
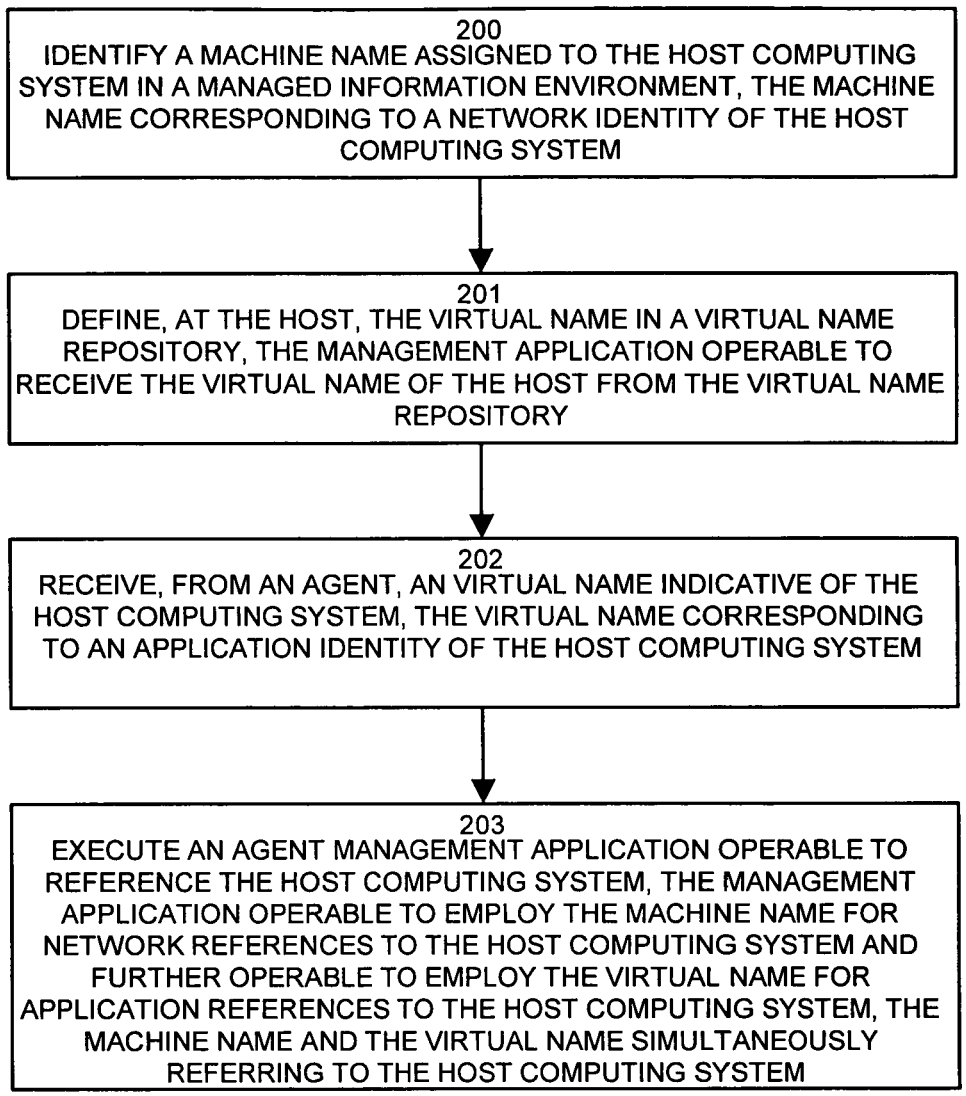
FIG. 2 is a flowchart showing failover management of manageable entity agents as defined herein.

FIG. 2 is a flowchart showing failover management of manageable entity agents as defined herein. Referring to FIG. 2, the method of referencing a host computing system in a storage area network includes identifying the machine name 134 assigned to the host computing system 120 in the managed information environment 100, in which the machine name 134 corresponds to the network identity of the host computing system 120, such as an IP address, as depicted at step 200. In a particular implementation, the host employs the machine name 134 by default, unless supplemented by the existence of the host name file 124. In such an instance, the host name file 124 effectively overrides the machine name 134 for management application 112 based references to the host 120, while the machine name 134 continues to be employed for network 130 and operating system based references.

An operator initially defines, at the host 120, the virtual name in a virtual name repository (file) 124, in which the management application 112 is operable to receive the virtual name 160 of the host from the virtual name repository 124, as shown at step 201. In the exemplary configuration shown, the virtual name repository, or host name file 124 occupies the external configuration device 126, which is accessibly by the typical host 120 via a local disk or other non-volatile storage medium. Alternate configurations may employ alternate mechanisms for denoting the virtual name 160, such as dissemination from a common central repository, for example.

The server 110 receives, from an agent 120-1 on the host 120, the virtual name 160 indicative of the host computing system 120, in which the virtual name 160 corresponds to an application identity (i.e. as known to the management application) of the host computing system 120, as depicted at step 202. Therefore, an agent 120-N, such as the master agent 120-1, queries the external configuration device 126 and reads the host name file 124 to determine the virtual name 160 of the host 120. The agent 120-1 sends the virtual name 160 to the server 110 as message 162.

The server 110 executes the management application 112 operable to reference the host computing system 120, and receives the message 162 including the virtual name 160 of the host 120. The management application 112 is operable to employ the machine name 134 for network references to the host computing system 120, and further operable to employ the virtual name 160 for application references to the host computing system 120, in which the machine name 134 and the virtual name 160 simultaneously refer to the host computing system 120, as depicted at step 203. Therefore, the management application 112 maintains both the hardcoded machine name 134 and the host name file 124 defined virtual name for the host 120, and employs the virtual name 160 as the name of the host 120 for references within the management application 112.

Figure 3:
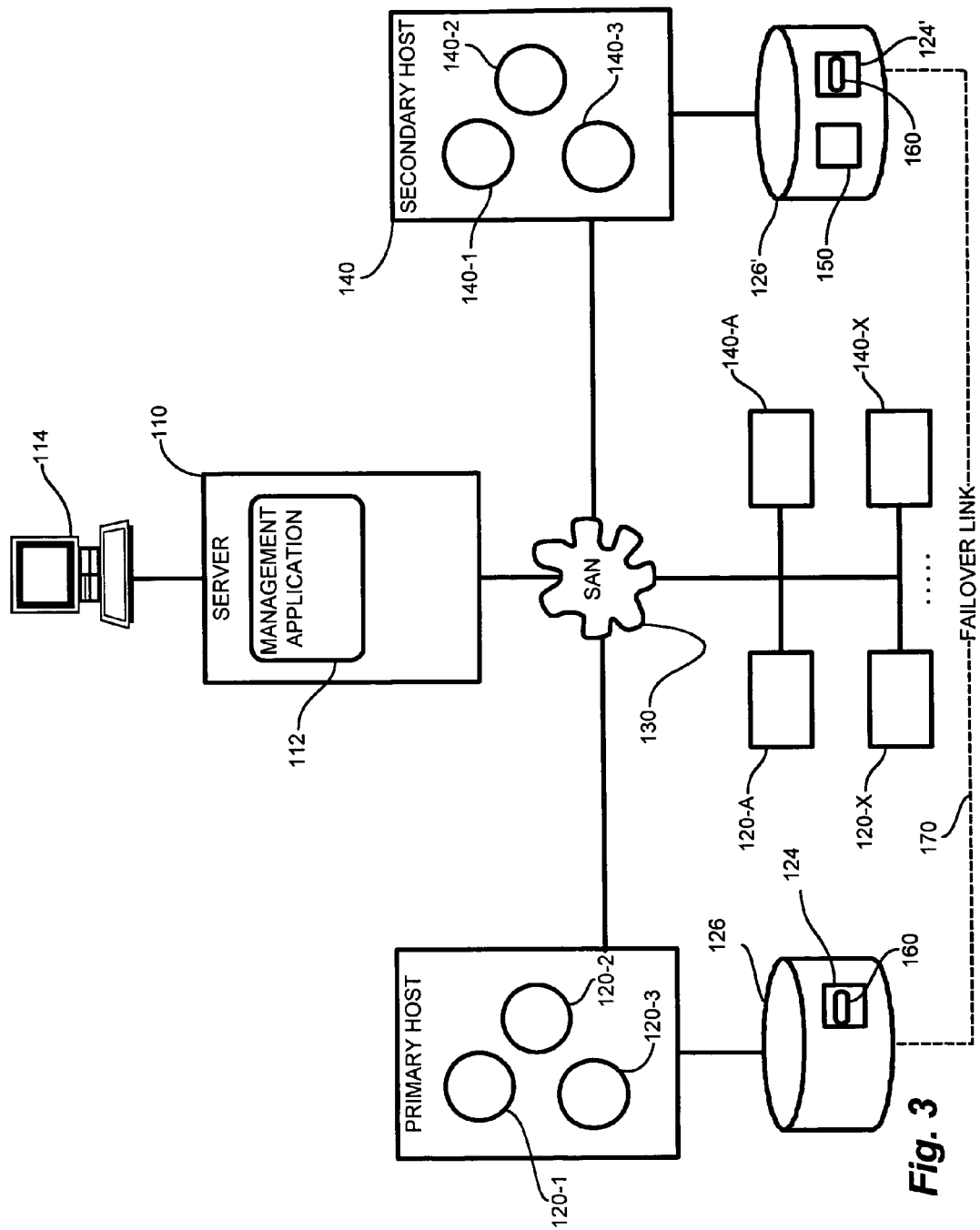
FIG. 3 is a block diagram of host renaming from a first host to a second host in the managed information environment depicted in FIG. 1.

FIG. 3 is a block diagram of host 120 renaming from a first host to a second host in the managed information environment depicted in FIG. 1. Such a renaming may occur in the context of a failover operation, for example. Referring to FIG. 3, in a typical managed information environment 100, the SAN 130 may provide a critical service, such as information support, to the users (not specifically shown) of the managed information environment 100. Since the SAN 130 typically provides mass storage access services to an entire organization or enterprise, the SAN 130 may support a secondary failover site, or "hot site." Such a hot site maintains a redundant backup facility for emulating the primary site in the event of unexpected or catastrophic failure at the primary site. During normal operation, the hot site duplicates data access operations at the primary site to maintain the hot site in a state of readiness. In the event of a catastrophic event, such as fire, earthquake, or power outage rendering the primary site either partially or wholly inoperative, the hot site activates via a failover switching operation to continue to provide the SAN 130 services to the organization or enterprise.

Figure 4:
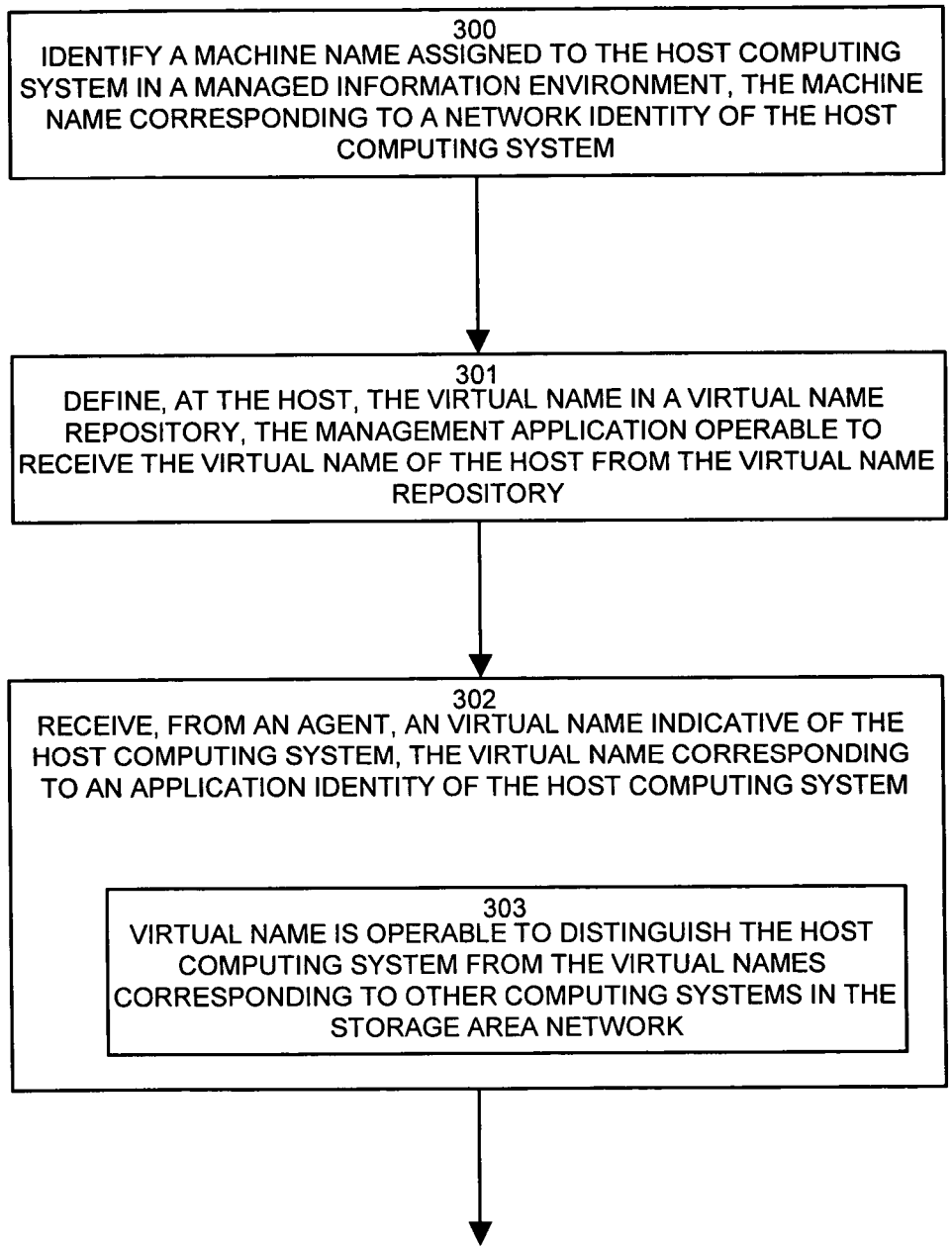
FIGS. 4-7 are a flowchart showing dynamic host renaming for failover management as in FIG. 2 in greater detail.
Figure 5:
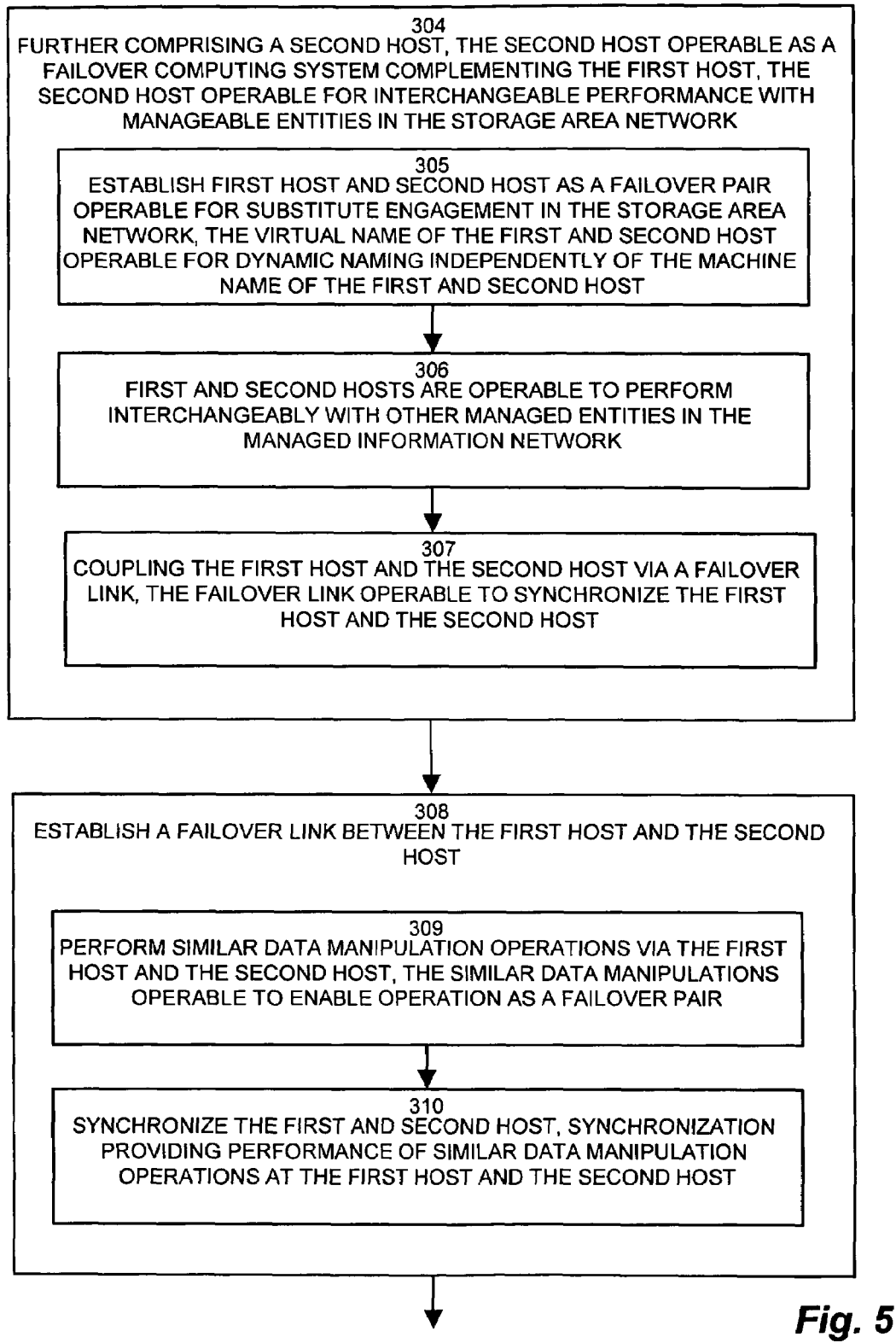
Figure 6:
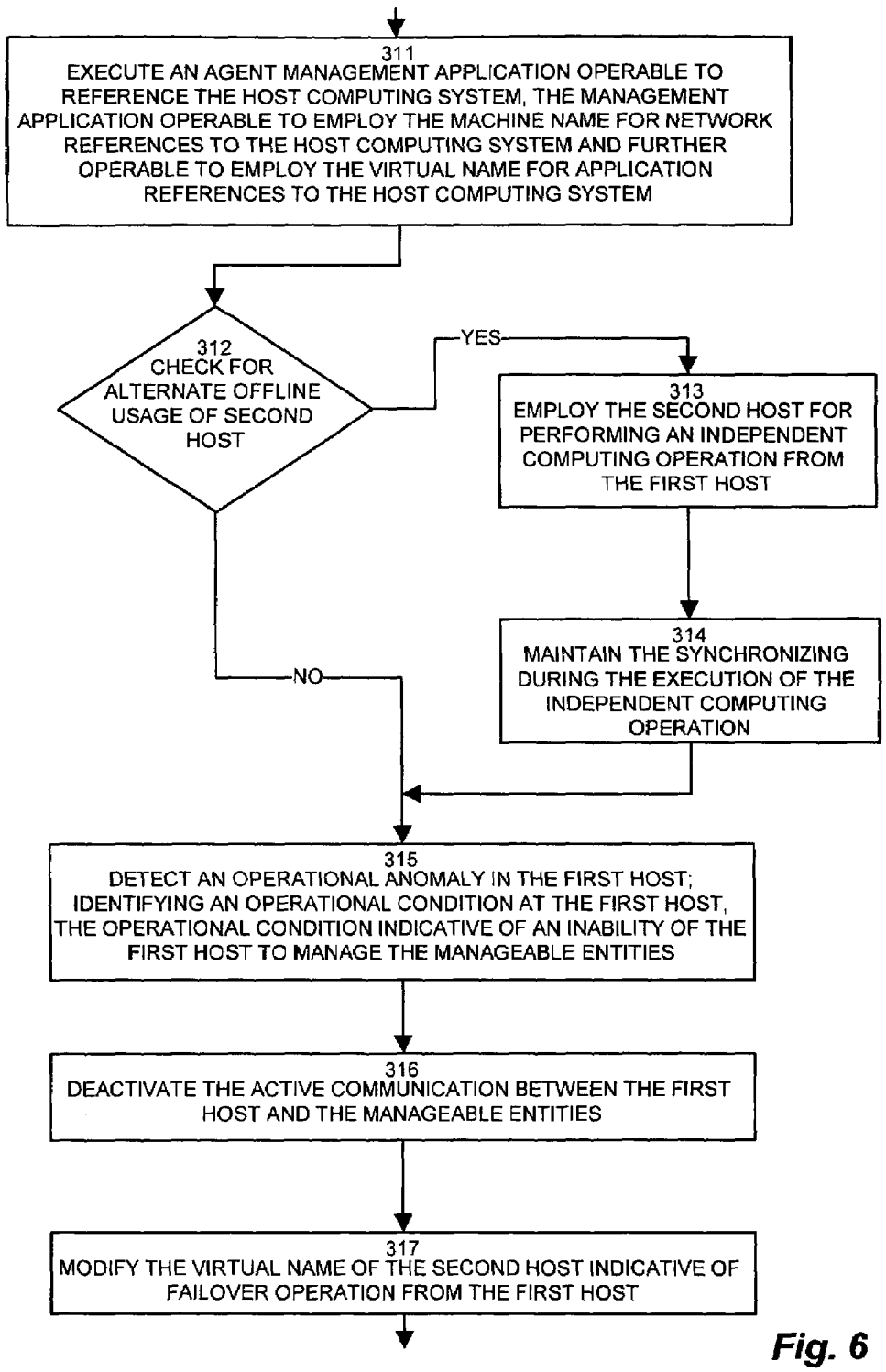
Figure 7:
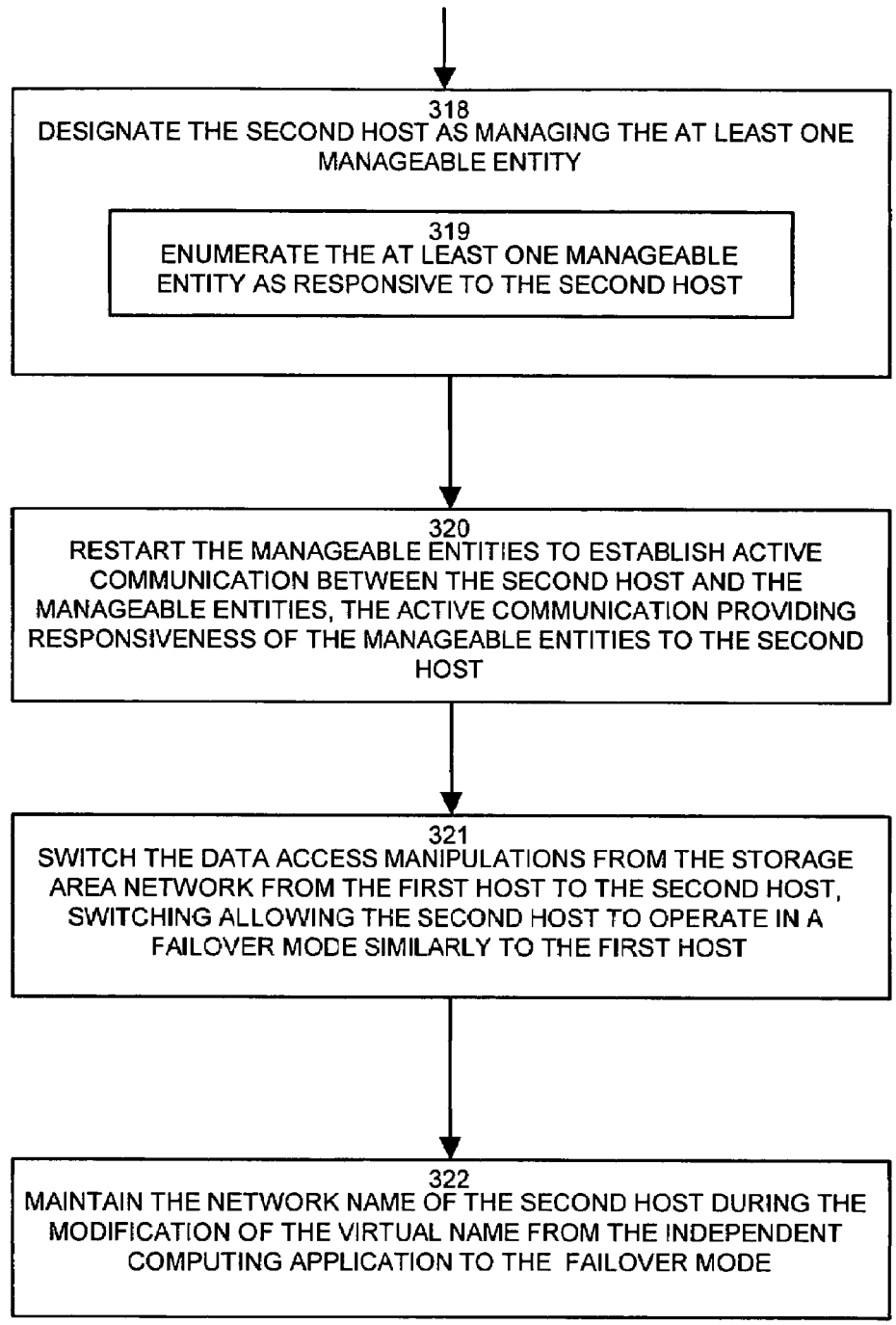

Accordingly, in a typical managed information environment 100, a redundant secondary host 140 at the hot site complements the primary host 120. Further, a typical configuration employs a plurality of primary hosts 120-A . . . 120-X, in addition to the exemplary primary host 140 shown, each having a corresponding secondary host 140-A . . . 140-X. The usage of a virtual name 160 may greatly facilitate user feedback and reporting via the console 114 when a number of hosts 120, 140 are available. In the exemplary configuration now described more fully with respect to FIGS. 4-6, each of the primary hosts 120 has an external configuration device 126 for storing a host name file 124, and each corresponding secondary hosts 140 also has an external configuration device 126' having a host name file 124'.

The external configuration devices 126 and 126' provide non-volatile storage of the management application and the agents 120-N, 140-N for installation on the particular host. As will be discussed further below, the external configuration device is typically a network drive (typically not the storage array device 124 managed by the host) for storing executable files of the management application 112 and the agents 120-N, 140-N. Such configuration devices 126 could be a local drive to the host 120, 140, however, failover processing from the secondary node 140 suggests that the external configuration device 126, accessible to both the primary host 120 and secondary hosts, 140, facilitates failover operation via the failover (SRDF) link 160. As will be discussed further below in FIG. 11, both hosts 120 and 140 may install the management application 112 and agents 120-N, 140-N from the same external configuration device 126, and not employ the failover link between the devices 126 and 126'. Further, in particular configurations, the secondary host 140 is operable to execute an alternate application 150 during normal operation of the primary site pending a failover switching, also described further below.

FIGS. 4-7 are a flowchart showing dynamic host renaming for failover management as in FIG. 2 in greater detail. Referring to FIGS. 4-7, upon host startup, the host 120 identifies and reports to the server 110 the machine name 134 assigned to the host computing system 120 in the managed information environment 100, in which the machine name 134 corresponds to a network identity of the host computing system 120, as depicted at step 300. The machine name 134 is typically designated by an operations or IT staff as part of a hardware configuration, and may bear little mnemonic resemblance to the operation of the host 120 with respect to the management application 112. The network name 134 is typically based on the IP address to denote a network location of the machine, and continues to be employed for network communication references to the host 120 simultaneously with the virtual name 160.

A user or operator defines, at the host 120, the virtual name 160 in a virtual name repository such as the external configuration device 126, in which the management application 112 is operable to receive the virtual name 160 of the host 120 from the external configuration device 126, as shown at step 301. The host 120 retrieves the virtual name 160 by reading the external configuration device 126, typically a host name file 124, which the host 120 employs during startup of the agents 120-N. Typically, as the host 120 starts, each of the agents 160-N resident on the host 120 also startup. One or more agents 160-N, such as the master agent 160-1, query the repository 126 to find the host name file 124, if it exists. In alternate configurations, absence of a host name 160 in the host name file 124 results in the management application 112 employing the machine name 134 for references to the host 120.

The server 110 receives, from an agent 120-N, such as the master agent 120-1, the virtual name 160 indicative of the host computing system 120, in which the virtual name 134 corresponds to an application identity of the host computing system 120, as shown at step 302. The application identity is the manner in which the host 120 is referenced within the management application 112. The management application 112 frequently receives and displays the identity of hosts 120 for monitoring and reporting status of the manageable entities 132 interconnected in the SAN 130. The application identity, being operator specified, is operable for convenient and/or mnemonically descriptive naming for inclusion on status reports generated by the management application and for user specification when directing the hosts 120 via the management application 112, such as starting and stopping agents 120-N on a particular host, for example. In the particular exemplary configuration, the virtual name 160 is operable to distinguish the host computing system from the virtual names corresponding to other computing systems in the storage area network, as depicted at step 303, to avoid inconsistencies and ambiguities in the references to each of the hosts 120.

As indicated above, disaster recovery measures of many enterprises frequently employ a redundant hot site. The hot site becomes operational as part of a failover management operation for switching the SAN 130 service provision from the primary site to the hot site. Accordingly, in such an implementation, the host computing system is a first (primary) host 120 and the environment 100 further comprises a second (secondary) host 140, in which the secondary host 140 is operable as a failover computing system complementing the primary host 120, as depicted at step 304. In such an implementation, the second host 140 is operable for interchangeable performance with manageable entities 132 in the storage area network 130 for providing similar data access services.

Accordingly, the first host 120 and second host 140 operate as a failover pair operable for substitute engagement in the storage area network 130, in which the virtual name 160 of the first host 120 and second host 140 are operable for dynamic naming independently of the machine name 134 of the first and second hosts 120, 140, as shown at step 305. Therefore, the first host 120 and second host 140 are operable to perform interchangeably with other managed entities 132 in the managed information network 100, as depicted at step 306. Such interoperability enables the failover switching by maintaining the secondary (failover) host in a state of readiness with a configuration of agents similarly to the primary host 120. The managed information environment 100 couples the first host 120 and the second host 140 via a failover link 160, in which the failover link 160 is operable to synchronize the first host 120 and the second host 140, depicted at step 307.

As indicated above, the hosts 120, 140 provide data access operations to a number of manageable entities, typically storage arrays. The failover link 160 therefore provides that operations applied via the primary host 120 are also undertaken by the secondary host 140 to maintain the manageable entities 132 of the hot site updated and operational. Accordingly, the server 110 establishes the failover link 160 between the first host 120 and the second host 140 using the coupling from step 307, as shown at step 308. In a particular exemplary configuration, the failover link 160 is a Symmetrix Remote Data Facility (SRDF) link, marketed commercially by EMC® corporation of Hopkinton, Mass., assignee of the present application, and the manageable entities include storage arrays such as the Symmetrix® device, also by EMC.

In further detail, the failover link 160 allows the SAN and interconnected manageable entities 132 to perform similar data manipulation operations via the first host 120 and the second host 140, in which the similar data manipulations operable enable operation as a failover pair by shadowing data updates to the hot site via the secondary host, as depicted at step 309. The failover link 160 also provides synchronizing of the first and second host, as shown at step 310. Such synchronization provides performance of similar data manipulation operations at the first host and the second host, such as accommodation for backups and other temporary unavailability or latency delay on one host of the failover pair, by queuing and storing updates as appropriate.

Following initial startup of the primary host, indicative of the exemplary site, and the secondary host, indicative of the hot site, the server executes the agent management application 112 operable to reference the primary host computing system 120 and the secondary host 140, in which the management application 112 is operable to employ the machine name for network references to the host computing system 120. As indicated above, the management application 112 is further operable to employ the virtual name 160 for application references to the host computing system 120, in which the machine name and the virtual name simultaneously refer to the host computing system 120, as depicted at step 311. Accordingly, the SAN 130 is actively providing data access services to various enterprise users via the primary host 120 and other hosts 120-X so connected.

In a typical SAN 130 environment, normal uptime via the primary host 120 is expected to occupy the majority of data access services operation. Generally, the hot site having the secondary host 140 may potentially remain idle until a need to transfer SAN operation and bring the secondary hosts online. Accordingly, in particular configurations, it is desirable to utilize the secondary hosts for alternate computing operations pending a need for hot site operation as a secondary host emulating a failed primary host.

Accordingly, a secondary host may perform alternate non-critical computing activities, such as executing an alternate application, for example payroll, billing, or accounting activities, to maximize usage of the secondary host as a computing resource. However, such an alternate application may employ the secondary host under a different machine or virtual name than that used for failover operation. Therefore, an operator may modify the virtual name 160 in the host name file 124' as part of the failover operation from the primary host.

A check is performed, at step 312, to determine if there is to be alternate offline usage of second host. If so, then the operator employs the secondary host for performing an independent computing operation from the first host by executing the alternate application 150, as depicted at step 313. The failover link 170 maintains the synchronization of the primary and secondary hosts 120, 140 during the execution of the independent computing operation, as shown at step 314, by continuing the parallel data access operations for corresponding manageable entities 132 in the failover pair.

At a successive time during normal operation, the management application 112 detects an operational anomaly in the first host, as depicted at step 315. Such detection involves identifying an operational condition at the primary host which is indicative of an inability of the first host to manage the manageable entities. Upon such detection, the management application initiates the failover operation by deactivating the active communication between the first host and the manageable entities, as depicted at step 316. Deactivation includes stopping the agents 120-N executing on the primary (first) host 120, or alternatively, simply placing them in a deactive state via the management application 112 such that the agents 120-N remain idle pending reactivation or termination, depending on the severity of the operational anomaly.

The management application 112 then modifying the virtual name 160 of the second host indicative of failover operation from the first host, as depicted at step 317. The virtual name 160 changes to designate the operation in a failover mode, emulating the operation of the primary host 120, and typically mnemonically identifies the relation to the primary host, although the selection is according to operator discretion. The virtual name may change to a name different than that employed for the alternate application 150, or further, if the machine name is representative of the alternate application, for example, the virtual name 160 employed for failover allows descriptive, mnemonic naming for the management application 112.

Employing the management application 112, which may itself be on a failover server to the main server 110, the operator designates the secondary host 140 as managing the manageable entities 132 in the SAN 130, as shown in step 318, and shown and described further below in the exemplary screen shots of FIGS. 8-10. The failover further employs the graphical user interface (GUI) of the management application 112 to enumerate the manageable entities 132 as responsive to the secondary host 140 as a failover to the primary host 120, as depicted at step 319.

The management application 112 then restarts the manageable entities to effect the change in responsiveness to the secondary host 140 as a failover to the primary host 120. Note that the physical manageable entities 132 also have failover counterparts, and the agents 140-N controlling the manageable entities are software entities executing on the secondary host in a similar configuration as on the primary host 120. Accordingly, failover includes restarting the manageable entities 132 to establish active communication between the secondary host 140 and the manageable entities 132, in which the active communication provides responsiveness of the manageable entities 132 to the secondary host 140, as depicted at step 320.

The operator then directs the management application 112 to employ the second host as emulating the first host, as depicted at step 321. Accordingly, the management application 112 switches the data access manipulations performed on the storage area network 130 (i.e. via the manageable entities 132) from the first host 120 to the second host 140, in which the switching allowing the second host 140 to operate in a failover mode similarly to the first host 120. The management application 112 then maintains the network name of the second host during the modification of the virtual name from the independent computing application to the failover mode, as depicted at step 322. In the exemplary configuration, the machine name 134 persists for both the primary host 120 and the secondary host 140 while the custom, user defined virtual name changes according to the needs of execution as a primary, failover, or alternate application 150 based operation.

It should be noted that the failover operation to resume SAN control on the secondary host 140 (typically hosts, since many host are usually part of the failover) may be a manual, partially automated, or fully automated operation. In the particular exemplary configuration, operator manipulation of executable entities, such as starting the agents on the secondary hosts, is performed. Further, the management application changes the agents and manageable entities corresponding to the primary host to inactive and activates those corresponding to the secondary host 140. Alternate configurations may automate this process by, for example, enumerating the failover hosts and agents in a failover configuration file for execution by a failover process.

Figure 8:
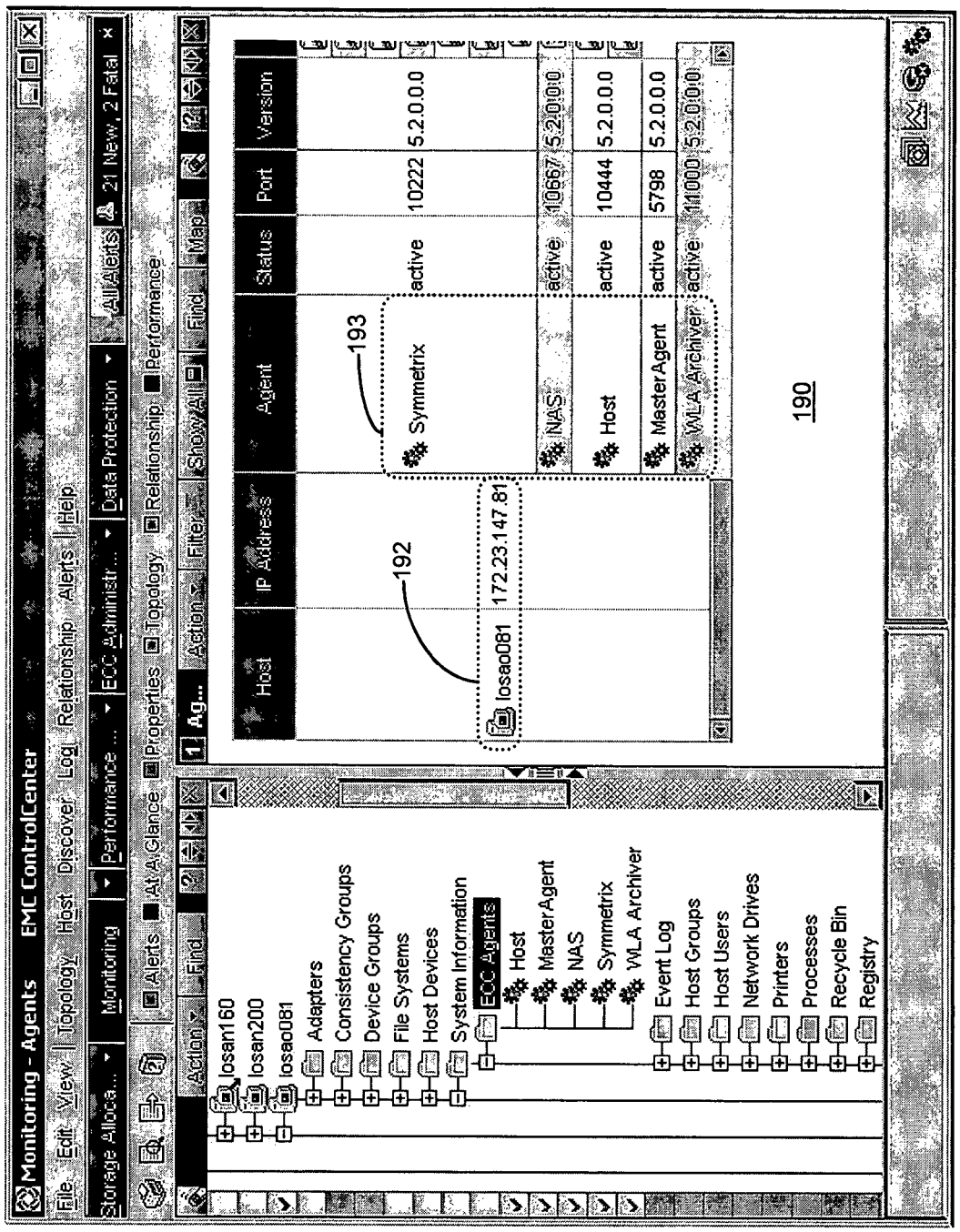
FIGS. 8-10 are exemplary graphical user interface displays illustrating dynamic host renaming as disclosed herein.
Figure 9:
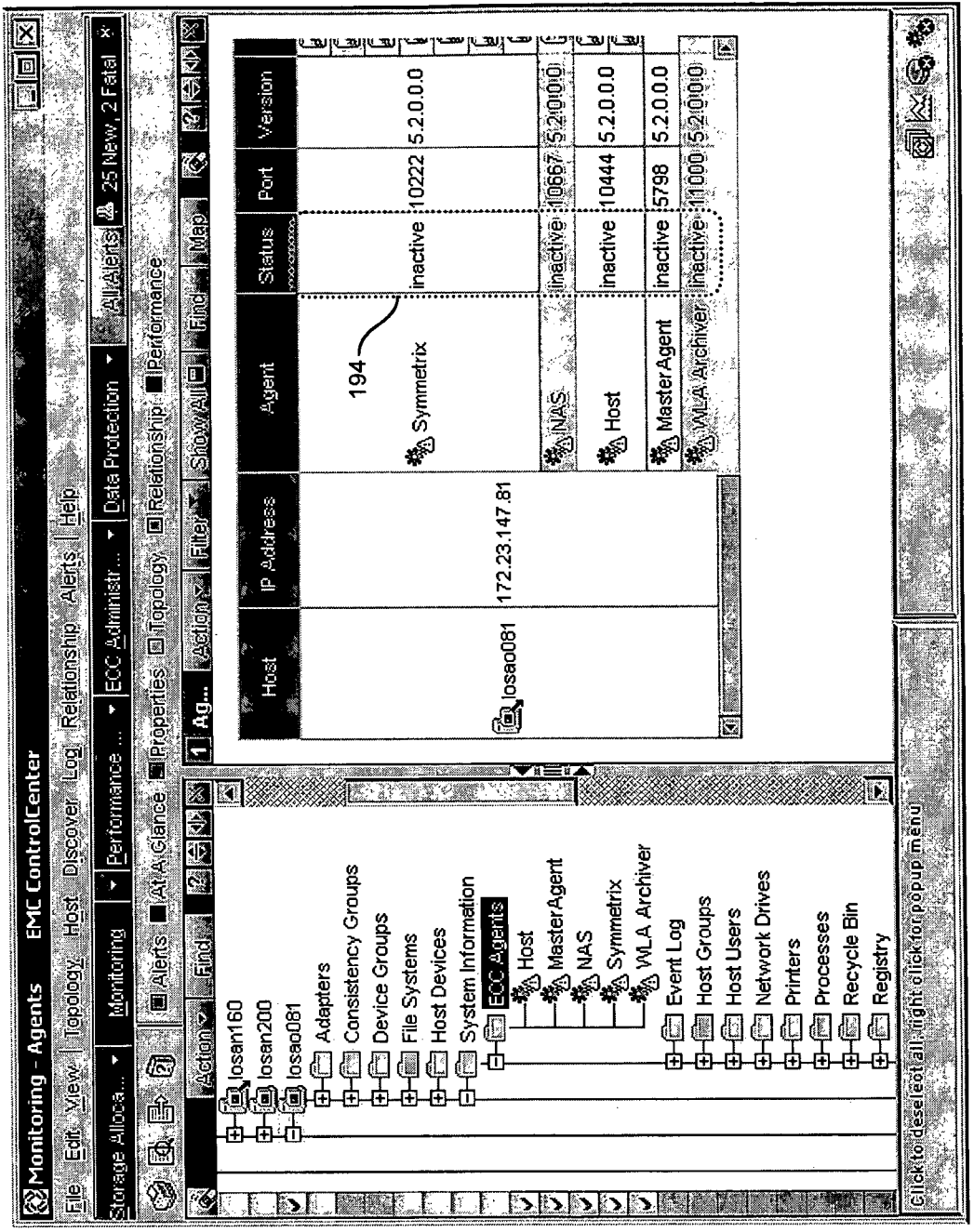
Figure 10:
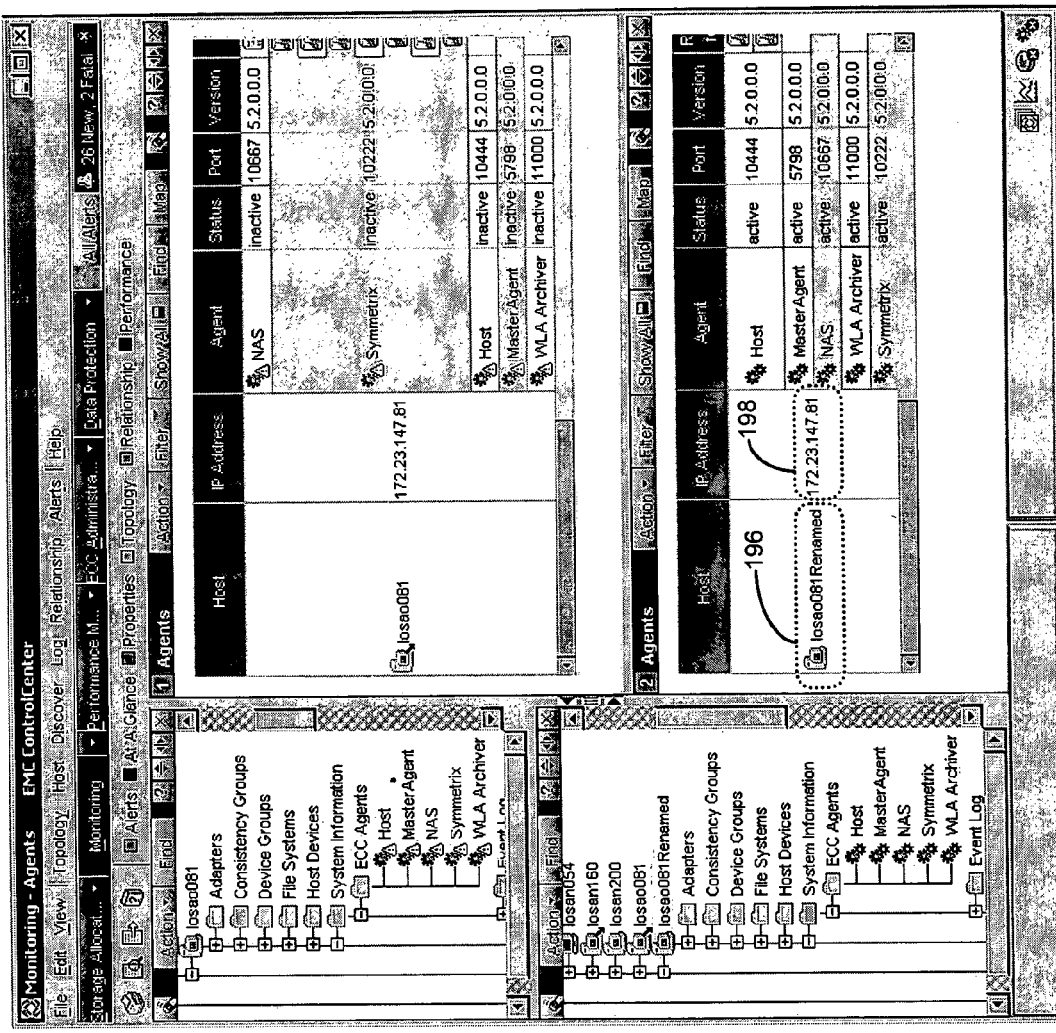

FIGS. 8-10 are exemplary graphical user interface displays illustrating dynamic host renaming as disclosed herein. Referring to FIGS. 8-10, a modification of the virtual name 160 is shown as appearing on the console 114 in the exemplary system of FIG. 1. FIG. 8 shows the GUI screen 190 having the host with the virtual name losao081 192 running a plurality of agents 193. As indicate above, each of the agents 120-N, 140-N are operable to monitor and control one or more manageable entities 132, such as Symmetrix® storage arrays. FIG. 9 illustrates the same GUI display 190 after the agents 193 are placed in an inactive state pending a virtual name modification as defined herein, shown by dotted line 194. In FIG. 10, the host has the virtual name losap081Renamed, as indicated by the dotted line 196, however operative on the same physical machine, as shown by the matching IP address 198.

Figure 11:
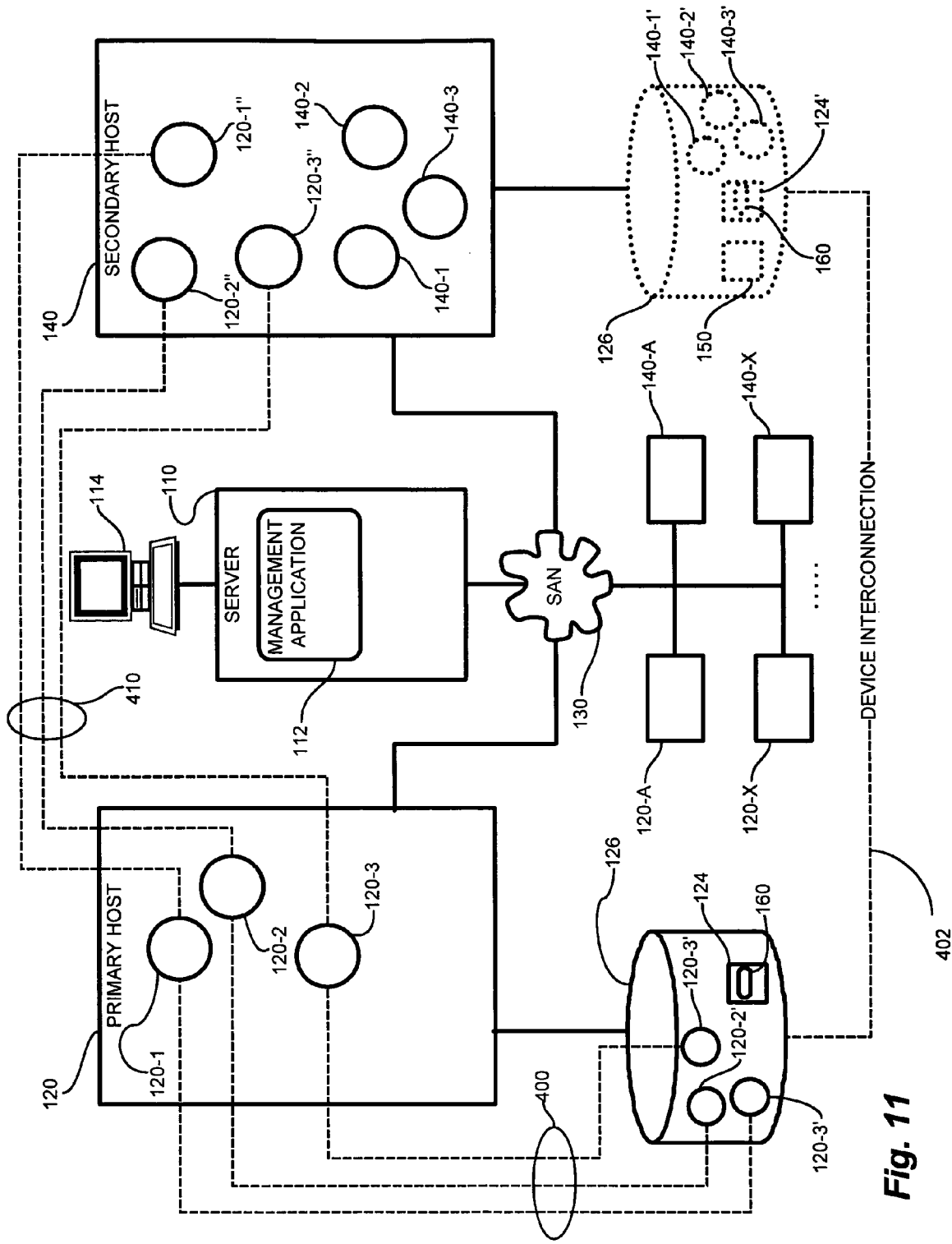
FIG. 11 shows the first host and second host in greater detail in an alternate configuration in which the primary host and secondary host share the same external configuration device.

FIG. 11 shows the primary host 120 and secondary host 140 in greater detail in an alternate configuration in which the primary host and secondary host share the same external configuration device 126. As indicated above, the hosts 120, 140 install the management application 112 and the agents 120-N, 140-N from the external configuration device 126. Referring to FIG. 11, the external configuration device 126 includes the host name file 124 and corresponding virtual name 160, as well as agents 120. In contrast to FIG. 3, in which each host 120, 140 of the failover pair has a corresponding configuration device 126 and 136' connected via a failover (SRDF) link, the hosts 120, 140 in FIG. 11 share a common external configuration device 126, as illustrated by the device interconnection 402 leading to the dotted lines defining the files employed on the secondary host 140. In implementation, the common external configuration device is the same physical unit and does not employ a virtual or shadowing redundancy as does the failover link between 126 and 126' in FIG. 3.

In the event of failover, the management application 112 stops the primary host 120 (if not already stopped due to operational conditions) and agents therein 120-N, modifies the virtual name 160 in the host name file 124, and restarts the agents 120-N on the secondary host 140, after terminating any currently executing agents 140-N. The restarted agents 120 look to the host name file 124 to determine the virtual name 160 of the secondary host 140. This alternate configuration is employed when the failover host pair 120, 140 share a single external configuration device 126 for the management application 112 (install), as shown by the dotted lines depicting the agents 140-N for the secondary host 140. The manageable entities 132 monitored thereby (i.e. a plurality of Symmetrix devices) may still employ a failover link 170 in failover pairs, as described above.

The agents 120 reside on the external configuration device 160, and the host 120 executes, or activates, the agents 120-1 ... 120-3 from the external configuration device 160. Prior to activation, the agents reside as configuration entities 120-1' ... 120-3' on the external configuration device. Upon startup, the host 120 activates the agents 120-1 ... 120-3 from the configuration entities 120-1' ... 120-3', as shown by dotted lines 400. Upon activation of the failover link 170, the secondary host 140 installs the agents 120-1" ... 120-3" corresponding to the primary host agents 120-1 ... 120-3 from the common external configuration device, as shown by dotted line 410.

The above described configurations illustrate exemplary arrangements of the host name file for facilitating agent activation and identification via the management application 112. FIG. 1 depicts standalone host 120 naming via the host name file 160, independently of a failover link such as the SRDF link. FIG. 3 discloses a failover example employing hosts 120 and 140 employing respective external configuration devices 126, 126' interconnected via the failover link 170. Upon failover operation, the secondary host 140 installs the primary agents 120-1 ... 120-3 from the external configuration device 126', maintained by the failover link. FIG. 10 depicts a single external configuration device 160 serving both the primary host 120 and the secondary host. Since both hosts 140, 160 install and obtain the host name file 124 from the same device, there is no need for a failover link such as an SRDF link to synchronize multiple external configuration devices 126, 126'. Note that in such a scenario, the storage array devices 132 supported by the host typically still exist in failover pairs. Therefore, the failover link 170 may remain between the manageable entities 132 independently of the existence of the failover link between the external configuration devices 126.

It should be further noted that, as discussed above, the virtual name 124 defaults to the same as the machine name 134 in the event that the host file name 124 is not found by the host 120, 140 and agents 120-N, 140-N upon startup. The management application 112 then refers to the host 120 according to the machine name 134. Non-existence of the host name file 124 is therefore interpreted as an indication that the operator does not wish to employ the host naming feature. Accordingly, in the above discussion, modification or entry of the host name file 124 may be taken to mean creation or update of the host name file 124, since nonexistence does not trigger error alerts, but rather employs the machine name 134 in lien of an explicitly specified custom host name 160.

The managed information system disclosed herein may encompass a variety of alternate deployment environments. In a particular configuration, the exemplary SAN management application discussed may be the EMC Control Center application (ECC), marketed commercially by EMC corporation of Hopkinton, Mass., assignee of the present application.

Those skilled in the art should readily appreciate that the programs and methods for failover management of manageable entity agents in a storage area network as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of instructions. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for referencing a host computing system in a storage area network has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of referencing a host computing system in a storage area network comprising:
   identifying a machine name assigned to the host computing system in a managed information environment, the machine name corresponding to a network identity of the host computing system;
   receiving, from an agent, an virtual name indicative of the host computing system, the virtual name corresponding to an application identity of the host computing system; and
   executing an agent management application operable to reference the host computing system by employing the machine name for network references to the host computing system and further operable to employ the virtual name for application references to the host computing system, the machine name and the virtual name simultaneously referring to the host computing system.

2. The method of claim 1 wherein the virtual name is operable to distinguish the host computing system from the virtual names corresponding to other computing systems in the storage area network.

3. The method of claim 1 further comprising defining, at the host, the virtual name in a virtual name repository, the management application operable to receive the virtual name of the host from the virtual name repository.

4. The method of claim 1 wherein the host computing system is a first host and further comprising a second host, the second host operable as a failover computing system complementing the first host, the second host operable for interchangeable performance with manageable entities in the storage area network.

5. The method of claim 4 where the first host and second host are a failover pair operable for substitute engagement in the storage area network, the virtual name of the first and second host operable for dynamic naming independently of the machine name of the first and second host.

6. The method of claim 4 wherein the first host is in active communication with at least one manageable entity for managing the manageable entity, the manageable entities responsive to the first host via the active communication, further comprising:
   deactivating the active communication between the first host and the manageable entities;
   designating the second host as managing the at least one manageable entity; and
   restarting the at least one manageable entity to establish active communication between the second host and the manageable entities, the active communication providing responsiveness of the manageable entities to the second host.

7. The method of claim 6 wherein designating further comprises:
   enumerating the at least one manageable entity as responsive to the second host; and
   restarting the at least one manageable entity to effect the change in responsiveness.

8. The method of claim 4 further comprising:
   coupling the first host and the second host via a failover link, the failover link operable to synchronize the first host and the second host; and
   performing similar data manipulation operations via the first host and the second host, the similar data manipulations operable to enable operation as a failover pair.

9. The method of claim 4 further comprising:
   identifying an operational condition at the first host, the operational condition indicative of an inability of the first host to manage the manageable entities;
   modifying the virtual name of the second host indicative of failover operation from the first host; and
   directing the management application to employ the second host as emulating the first host.

10. The method of claim 4 further comprising:
    establishing a failover link between the first host and the second host;
    synchronizing the first and second host, synchronization providing performance of similar data manipulation operations at the first host and the second host;
    employing the second host for performing an independent computing operation from the first host;
    detecting an operational anomaly in the first host;
    modifying the virtual name of the second host to correspond to the failover operation in substitution of the first host; and
    switching the data access manipulations from the storage area network from the first host to the second host, switching allowing the second host to operate in a failover mode similarly to the first host.

11. The method of claim 10 further comprising maintaining the synchronizing during the execution of the independent computing operation.

12. The method of claim 10 further comprising maintaining the network name of the second host during the modification of the virtual name from the independent computing application to the failover mode.

13. The method of claim 4 wherein the first and second hosts are operable to perform interchangeably with other managed entities in the managed information network.

14. A method of identifying managed entities in a storage area network comprising:
    identifying a first managed entity having a first machine name and a second managed entity having a second machine name, each of the first and second manageable entities operable to control a plurality of other manageable entities, the first and second managed entities adapted to perform similar operations;
    designating a first virtual name for the first managed entity and a second virtual name for the second managed entity;
    employing a management application, the first and second manageable entities responsive to the management application, the management application operable to identify the first and second manageable entities by the virtual name; and
    selectively employing one of either the first and second machine names or the first and second virtual names for referring to the respective first and second managed entities, the machine name corresponding to network location references and the virtual names corresponding to managed entity references, the first machine name and first virtual name simultaneously referring to the first managed entity and the second machine name and second virtual name simultaneously referring to the second managed entity.

15. The method of claim 14 wherein selectively employing further comprises:
identifying one of either the first and second manageable entities as a primary host operable for controlling a predetermined set of other manageable entities;
receiving an indication of inability of the primary host being unable to control the predetermined set of other manageable entities;
switching, by interchanging the respective virtual names of the first and second manageable entities, the designation of the primary host from the identified one of either the first and second manageable entities to the other of the first and second manageable entities.

16. A storage area network management device for referencing a host computing system in a storage area network comprising:
a processor operable to execute a sequence of instructions included in a management application;
a memory operable for storing the sequence of the instructions, input data, and results of executing the sequence of instructions; and
an interface to a storage area network; the management device further operable to
identify a machine name assigned to the host computing system in a managed information environment, the machine name corresponding to a network identity of the host computing system;
receive, via the interface from an agent, an virtual name indicative of the host computing system, the virtual name corresponding to an application identity of the host computing system; and
execute, via the processor, the management application to reference the host computing system, the management application operable to employ the machine name for network references to the host computing system and further operable to employ the virtual name for application references to the host computing system, the machine name and the virtual name simultaneously referring to the host computing system.

17. The storage area network management device of claim 16 wherein the virtual name is operable to distinguish the host computing system from the virtual names corresponding to other computing systems in the storage area network.

18. The storage area network management device of claim 16 wherein the management application is further operable to define, at the host, the virtual name in a virtual name repository, the management application operable to receive the virtual name of the host from the virtual name repository.

19. The storage area network management device of claim 16 wherein the host computing system is a first host and further comprising a second host, the second host operable as a failover computing system complementing the first host, the second host operable for interchangeable performance with manageable entities in the storage area network.

20. The storage area network management device of claim 19 where the first host and second host are a failover pair operable for substitute engagement in the storage area network, the virtual name of the first and second host operable for dynamic naming independently of the machine name of the first and second host.

21. The storage area network management device of claim 19 wherein the first host is in active communication with at least one manageable entity via the interface for managing the manageable entity, the manageable entities responsive to the first host via the active communication, the management application operable to:
deactivate the active communication between the first host and the manageable entities;
designate, via the interface, the second host as managing the at least one manageable entity; and
restart the at least one manageable entity to establish active communication between the second host and the manageable entities, the active communication providing responsiveness of the manageable entities to the second host.

22. The storage area network management device of claim 21 wherein the management application is further operable to:
enumerate, in the memory, the at least one manageable entity as responsive to the second host; and
restart, via the interface, the at least one manageable entity to effect the change in responsiveness.

23. The storage area network management device of claim 19 wherein the interface is further operable to:
couple the first host and the second host via a failover link, the failover link operable to synchronize the first host and the second host; and
perform similar data manipulation operations via the first host and the second host, the similar data manipulations operable to enable operation as a failover pair.

24. The storage area network management device of claim 19 wherein the management application is further operable to:
identify an operational condition at the first host, the operational condition indicative of an inability of the first host to manage the manageable entities;
modify the virtual name of the second host indicative of failover operation from the first host; and
direct the management application to employ the second host as emulating the first host.

25. The storage area network management device of claim 19 wherein the management application is further operable to:
establish a failover link between the first host and the second host;
synchronize the first and second host, synchronization providing performance of similar data manipulation operations at the first host and the second host;
employing the second host for performing an independent computing operation from the first host;
detect an operational anomaly in the first host;
modify the virtual name of the second host to correspond to the failover operation in substitution of the first host; and
switch the data access manipulations from the storage area network from the first host to the second host, switching allowing the second host to operate in a failover mode similarly to the first host.

26. The storage area network management device of claim 19 wherein the first and second hosts are operable to perform interchangeably with other managed entities in the managed information network.

27. The method of claim 3 wherein the virtual name repository is included in an external configuration device, the external configuration device operable as a standalone resource corresponding to the host computing system and further operable to store agents for activation on the host computing system.

28. The method of claim 4 wherein the first and second hosts are in each in communication with a respective first external configuration device and second external configuration device, the external configuration devices operable to install the agents corresponding to each of the first and second hosts, and the first and second external configuration devices further coupled via a failover link operable to allow operation as a failover computing system.

29. The method of claim 4 wherein the first and second hosts are in each in communication with an external configuration device operable to install the agents corresponding to each of the first and second hosts, either of the first and second hosts operable to install agents and perform operation according to the virtual name from the external configuration device.

30. The method of claim 27 wherein the host computing system is operable according to at least one of a virtual name from a corresponding dedicated external configuration device, a virtual name from one of either a first external configuration device and a second external configuration device, the first and second external configuration devices operable for failover operation via a failover link, and a virtual name from a shared external configuration device, the shared external configuration device operable to provide a virtual name to at least one alternate host computing system.

31. A computer readable storage medium operable to store computer program logic embodied in computer program code encoded thereon that, when executed by a processor responsive to the computer program code to perform steps referencing a host computing system in a storage area network comprising:
    identifying a machine name assigned to the host computing system in a managed information environment, the machine name corresponding to a network identity of the host computing system;
    receiving, from an agent, an virtual name indicative of the host computing system, the virtual name corresponding to an application identity of the host computing system; and
    executing an agent management application operable to reference the host computing system by employing the machine name for network references to the host computing system and further operable to employ the virtual name for application references to the host computing system, the machine name and the virtual name simultaneously referring to the host computing system.

32. A computer readable storage medium for storing instructions that, when executed by a processor cause the computer to perform steps for data signal for of referencing a host computing system in a storage area network comprising:
    identifying a machine name assigned to the host computing system in a managed information environment, the machine name corresponding to a network identity of the host computing system;
    receiving, from an agent, an virtual name indicative of the host computing system, the virtual name corresponding to an application identity of the host computing system; and
    executing an agent management application operable to reference the host computing system by employing the machine name for network references to the host computing system and further operable to employ the virtual name for application references to the host computing system, the machine name and the virtual name simultaneously referring to the host computing system.

33. A management server for managing a host computing system in a storage area network comprising:
    means for identifying a machine name assigned to the host computing system in a managed information environment, the machine name corresponding to a network identity of the host computing system;
    means for receiving, from an agent, an virtual name indicative of the host computing system, the virtual name corresponding to an application identity of the host computing system; and
    means for executing an agent management application operable to reference the host computing system by employing the machine name for network references to the host computing system and further operable to employ the virtual name for application references to the host computing system, the machine name and the virtual name simultaneously referring to the host computing system.

* * * * *